C. ELLIS.
DOG BISCUIT.
APPLICATION FILED OCT. 25, 1907.
982,711.
Patented Jan. 24, 1911.
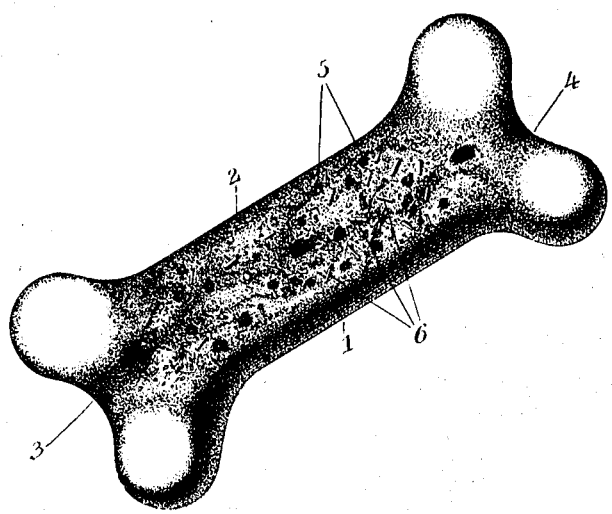
Witnesses
Arthur Wright
M. Lobel
Inventor
Carleton Ellis
By Attorneys
Prindle Wright

UNITED STATES PATENT OFFICE.

CARLETON ELLIS, OF LARCHMONT, NEW YORK, ASSIGNOR TO ELLIS FOSTER COMPANY, A CORPORATION OF NEW JERSEY.

DOG-BISCUIT.

982,711.    Specification of Letters Patent.    Patented Jan. 24, 1911.

Application filed October 25, 1907. Serial No. 399,179.

*To all whom it may concern:*

Be it known that I, CARLETON ELLIS, a citizen of the United States, and a resident of Larchmont, in the county of Westchester and State of New York, have invented certain new and useful Improvements in Dog-Biscuits, of which the following is a specification.

This invention relates to an improved form of dog biscuit having particularly for its object the utilization of the waste milk of slaughter houses, as well as other material of little value, which must daily be disposed of in abattoirs and similar establishments. My invention also has to do with the production of said dog biscuit in the shape of a bone, or elongated, flattened dumbbell, which I have found to be an especially attractive form for dogs; it being common observation that dogs generally refuse to eat ordinary dog biscuit until forced to by being refused other food for a period of time. A dog acquires a taste for ordinary dog biscuit only after being fed upon it for extended periods, and the first attempt at feeding such material is beset with great difficulty. At first it is generally necessary to feed this material in the form of fragments saturated with fresh meat extract soups, etc. By forming my improved composition into a shape resembling that of a bone, the dog to whom same is fed, does not object to the food, but seizes upon it with alacrity.

An illustrative formula may comprise:—concentrated waste milk 1 gallon, gluten flour 9 pounds, corn meal 2 pounds, crushed bone 1 pound, chopped dried meat 2 pounds, baking powder 1 ounce, salt ½ ounce.

The waste milk from the cattle sheds is evaporated to one half its original bulk in a steam jacketed kettle, or in any other suitable way to form the concentrated product. The flour, meal, baking powder and salt may be mixed and added to the concentrated milk, with agitation, to make a stiff dough. The meat and bone is then worked in, and the plastic mass rolled into sheets of about one inch, or so, in thickness and cut into the shape of a bone or dumbbell.

By reference to the accompanying drawing, the shape of this new article of manufacture will be apparent.

In the drawing, 1, illustrates a bone, having the shank, 2, and enlarged extremities, 3 and 4. At 5 is shown a particle of embedded meat, while 6 shows a fragment of bone similarly situated.

After cutting the composition in the form above specified, the "bone-cakes", as they may be conveniently termed, are preferably baked at a temperature of from 125° C. to 150° C. for a short time, and then air-dried for a week or so.

While ordinary starchy flour may be used in this composition, I prefer to employ a highly glutinous, rather dark colored flour, as being cheaper and of higher food value. The meat and bone should be chopped or crushed to pieces about the size of a bean. Oatmeal or rye flour may be substituted for the corn meal or gluten flour used exclusively as the proteid thickener. Chopped dried vegetables may also be introduced when desired. The chopped meat or bone may be introduced into the surface portion of the cakes after they have been cut to form, instead of mixing in the batch, so that the cake is in this manner more or less coated with the meat and bone particles. Bone dust, ground phosphate material, and the like, may also be introduced, if desired.

To recapitulate, my improved composition of matter consists of a baked cake composed largely of proteid material such as flour, meal and milk, and preferably containing phosphatic material such as crushed bone, and albuminous material, such as chopped dried meat; said composition being essentially in a form substantially that of a bone or flattened, elongated dumbbell. The article, being in the shape of a bone, is much better adapted to be grasped by a dog, especially a small dog or house dog, than is an ordinary square biscuit, the square shape being the only shape hitherto used. Furthermore, not only is this the case, but by the use of knobs on the ends of the cake, a dog is enabled more readily to chew the cake of material by tilting the cake upward upon one end by means of pressure from one of his paws, it being a common, well-known habit of dogs to chew bones in this manner.

Having described my invention, to the details of which, I, of course, do not limit myself, what I claim as my invention is:—

1. An article of manufacture, consisting of a suitable dog-food mixture molded into the shape of a bone having knob-like ends to render it attractive to dogs and capable of being readily grasped by them.

2. An article of manufacture, consisting of a suitable dog-food mixture molded into the shape of a bone, substantially like that of the femur, to render it attractive to dogs and capable of being readily grasped by them.

3. An article of manufacture, comprising comminuted nutritive matter molded into a rod having a knob on the end thereof to permit the rod to be tilted by pressure from a dog's paw.

Signed at New York in the county of New York and State of New York this 21st day of October A. D. 1907.

CARLETON ELLIS.

Witnesses:
 JAMES D. REMSON,
 NATHANIEL L. FOSTER.